(12) United States Patent
Viaud

(10) Patent No.: US 7,171,892 B2
(45) Date of Patent: Feb. 6, 2007

(54) ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/109,585

(22) Filed: Apr. 19, 2005

(65) Prior Publication Data

US 2005/0235843 A1 Oct. 27, 2005

(30) Foreign Application Priority Data

Apr. 23, 2004 (FR) .................... 04 101712

(51) Int. Cl.
*B30B 5/04* (2006.01)
(52) U.S. Cl. .................. 100/87; 100/88; 56/341
(58) Field of Classification Search ............ 100/87, 100/88, 89; 56/341, 344
See application file for complete search history.

(56) References Cited

U.S. PATENT DOCUMENTS 4,763,464 A * 8/1988 Mouret .................. 56/341

6,679,040 B2 * 1/2004 Lucand et al. ........... 56/341
6,745,680 B2 * 6/2004 Viaud et al. ............. 100/88
2003/0884792   5/2003 Lucand et al.

FOREIGN PATENT DOCUMENTS

| EP | 0 309 936 | 9/1988 |
|----|-----------|--------|
| EP | 0 309 941 | 9/1988 |
| EP | 1 080 627 | 8/2000 |
| EP | 1 264 531 | 6/2001 |
| FR | 2 793 382 | 5/1999 |

* cited by examiner

*Primary Examiner*—Lowell A. Larson
*Assistant Examiner*—Jimmy Nguyen

(57) ABSTRACT

A round baler is provided with a single set of baling means such as belts, which are rotated over a series of fixed and mobile rolls. In order to form a bale of a large diameter several loops are formed in said baling means, which loops are controlled by two pivot arms. On a first pivot arm at least three rolls are provided, of which one is an idler roll, and on the second pivot arm at least one idler roll is provided, which all create loops to avoid slack in the baling means.

15 Claims, 16 Drawing Sheets

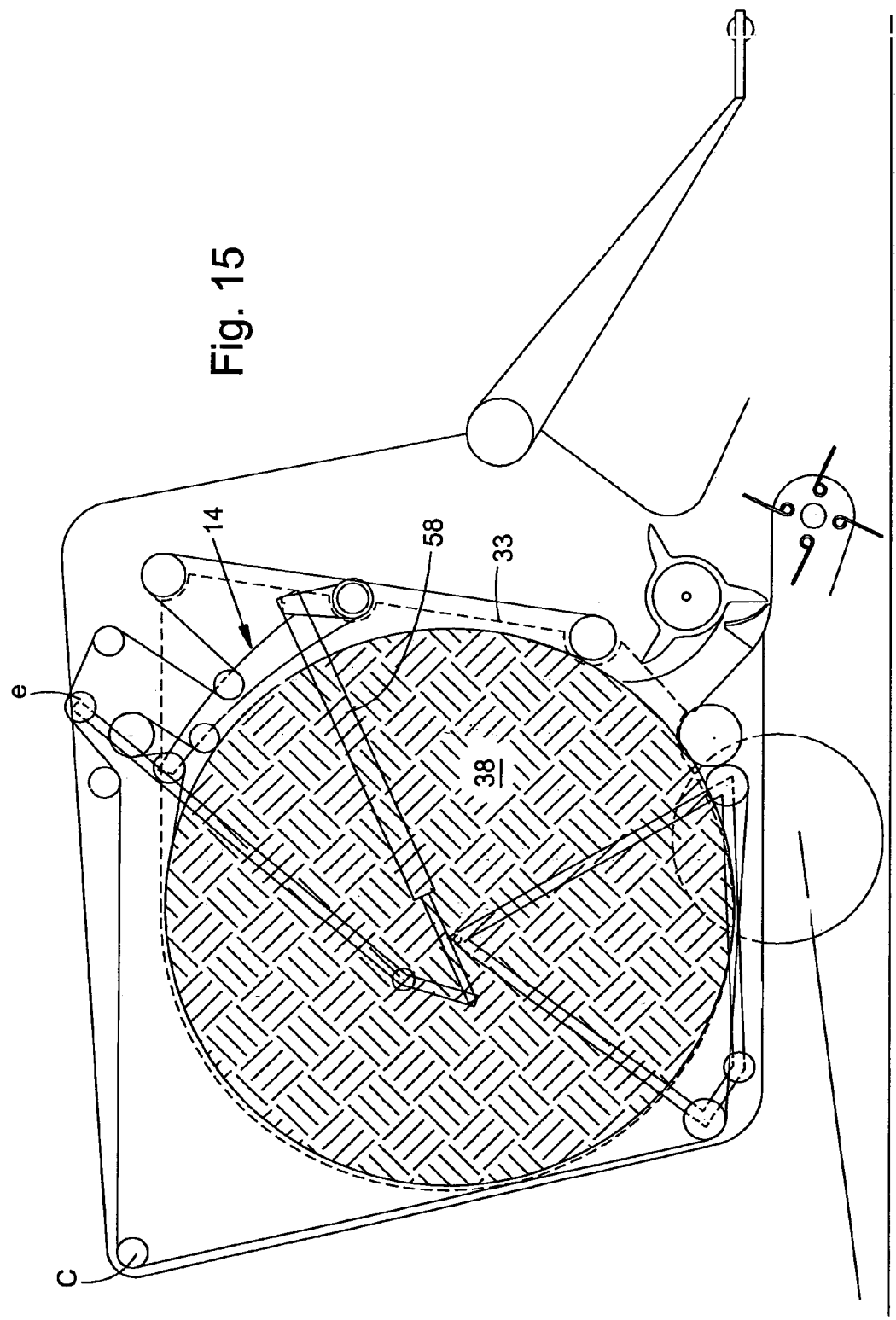

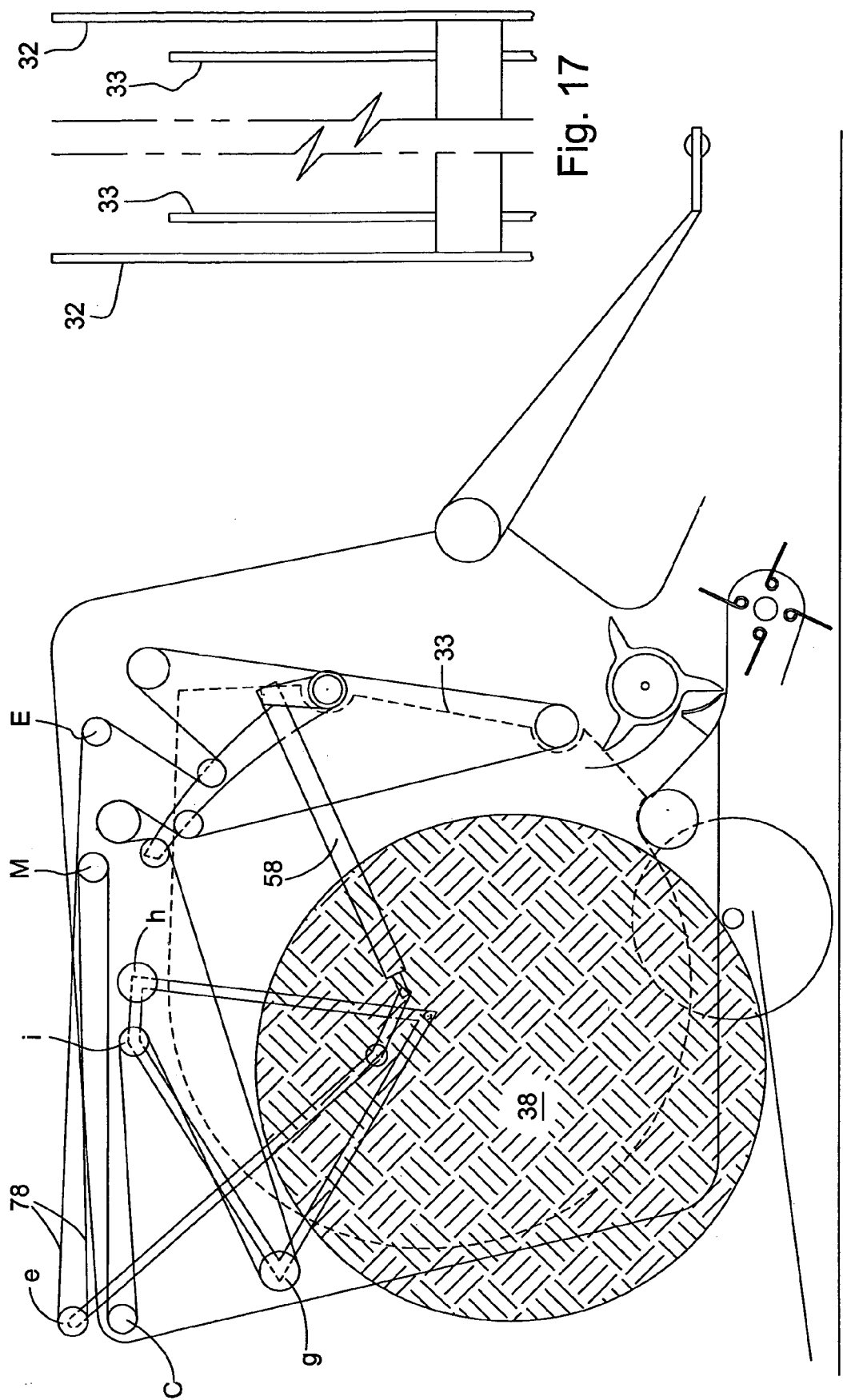

ized belts, which are routed over a series of fixed and mobile rolls, whereas the mobile rolls are carried on two tensioning arm, which create several loops to provide sufficient bale length to extend over the circumference of a completed bale. A lower tensioning arm is applied by a spring, which extends with additional crop entering the bale chamber.

ROUND BALER

BACKGROUND

1. Field of the Invention

This invention relates to a round baler having side structures, fixed rolls, at least two moveable pivot arms carrying mobile rolls, and flexible baling means creating one endless circle and routed over the rolls to encompass a bale chamber.

2. Related Technology

European Patent specification EP 309 936 B1 discloses a round baler with a single set of endless belts, which are routed over a series of fixed and mobile rolls, whereas the mobile rolls are carried on two tensioning arm, which create several loops to provide sufficient bale length to extend over the circumference of a completed bale. A lower tensioning arm is applied by a spring, which extends with additional crop entering the bale chamber.

EP A1 309 941 discloses a round baler with two sets of endless belts and two tensioning arms, which are controlled by means of a single hydraulic cylinder. This hydraulic cylinder is used to control the tension in the two sets of belts to provide for controlled movement of the bale during formation and unloading.

The problem this invention is based on is seen in the challenges of forming bales with a bigger diameter, like 2 m and more, whereas belts, chains or the like and their control means should be kept at a minimum to keep costs low.

SUMMARY

This invention discloses a first pivot arm that has a variety of configurations that increase with the diameter of the baling means. The idling roll shortens the loop in the baling means with the increasing diameter. The remaining rolls on the first pivot arm may be used for either controlling the movement of the baling means, for forming other loops in the baling means or for limiting the bale chamber. The baling means may include one or more belts or a chain and slat conveyor. The second pivot arm with its idling roll will assist the first pivot arm in retaining and freeing the length of the baling means during bale forming and after bale unloading. The two rolls between which a span extends onto which the roll of the second pivot arm will act in a fixed position on the baler. The rolls may be movable with a pivot arm or a mix of both. The mobile roll(s) moving with the unloading pivot frame independent of the walls allow a movement which is needed to control the slack in the baling means, without being restricted by the movement or non-movement of the walls for other reasons.

The location of the third idling roll on the first pivot arm has to be seen in relation to the capability of the baling means to get length by the movement of the second pivot arm or other means. If only a small amount of baling means length has to be granted by the idling roll, the roll may be situated close to the pivot axis of the first pivot arm. Whereas, if much length is required, it should be located far away from the pivot axis and preferably in its freely moving end region. Depending on the design of the first pivot arm, preparations may be made to install the idling roll at the one or at the other place. Situations may be given, in which rolls may be provided at both sides of the remaining two rolls.

A fourth roll may be offset from the first pivot arm and can be used to avoid friction between the end of the pivot arm and the bale forming means in one of the indefinite positions of both pivot arms. When two adjacent rolls are used on the first pivot arm to close the upper region of the bale chamber, they will be moved upwardly by the growing bale and control thereby the length of the baling means granted by the idling roll moving as well.

In one embodiment, a second pivot arm can move through the bale chamber and can assist the bale movement during unloading or at least avoid, that the bale rolls back. Having mobile rolls at the end of the second pivot arm remote from the pivot axis provides for a long path of the mobile rolls and may create a loop to either give length to the baling means or to control slack.

In one embodiment, mobile rolls are provided at both ends of the second pivot arm, one or more than one loop can be provided to avoid a frictional contact between the second pivot arm and the baling means in the course of their movement. Also, when the second pivot arm is provided with mobile rolls at its ends, the baling means strands run over these ends will neither be damaged nor create friction.

A second arm having legs being located outside the bale chamber may pivot through a bigger range, since no fixed or mobile rolls in the bale chamber will cross its path. By means of a common control for two pivot arms, as opposed to another control like a spring, the costs are kept lower as by using two of them. Using one set of baling means for a single bale chamber will provide for equal tension in the entire baling means. Additionally, one set of bailing means would allow for the bale circumference more closely than two baling mean because two bailing means have an interface gap to cover and may provide loops to provide for enough length required to encircle a big bale. The actuator may be driven hydraulically or electrically and may join the pivot arms directly or via links, cables or chains.

In order to provide for stability in the bale control means and assure that both pivot arms do not move in an undesired direction when specific baling conditions exist or to keep the whole tensioning system in a certain position when springs or other forces apply, it is helpful to use another actuator to control the entire tensioning system. Using actuators for each of the pivot arms provides more flexibility, especially in cases, in which components and parts are located in the area between both pivot arms, which block the space for installing a common actuator. In order to avoid interferences between the pivot arms or unwanted strength or slack in the baling means, all actuators are controlled by a common baling control means, which usually has an electronic control, sensors, a CPU, and/or the like.

While it is not excluded to use a rotary actuator, a linear actuator, such as a hydraulic cylinder, is preferred, since it may apply more power and is easier to connect. Hydraulic and electric drive actuators are easy to control and available on round balers driven by a tractor.

Resistance in the bale forming means against which the actuator is extended or retracted will result in tension in the baling means and this will create a dense bale. Such resistance may be variable during the baling process to provide a dense bale throughout its diameter or a soft core at the beginning and a dense bale later on.

By using lever arms to connect the actuator to the pivot arms, it is possible to select their position with respect to the pivot arm such, that the momentum can be best transferred. Another advantage is seen in the possibility to control the sense of rotation of the pivot arms, which can be adjusted to given structural restrictions, like rolls or struts crossing the path of the pivot arms.

In another embodiment, the actuator is arranged such that it is not fully retracted when the bale formation process starts, and may release the baling means length in a first movement as well as take slack out of the baling means in a second movement.

If a second arm of a U-shape can pivot outside the bale chamber and extends to the front of the round baler with its mobile role routing the baling means, it does not restrict the area in which net wrapping or tying means ought to be placed. A rearward location of the pivot center of the second pivot avoids that the front end of the second pivot arm will extend too far beyond the front or upper edge of the round baler.

BRIEF DESCRIPTION OF THE DRAWINGS

FIG. 15 shows the round baler of FIG. 14 with a completed bale, and

FIG. 16 shows the round baler of FIG. 14 with a completed bale during unloading.

FIG. 17 is a partial front view of the baler shown in FIGS. 1–16 showing only the side wall structure of the baler.

DETAILED DESCRIPTION OF THE DRAWINGS AND THE PRESENTLY PREFERRED EMBODIMENTS

Figure 1:
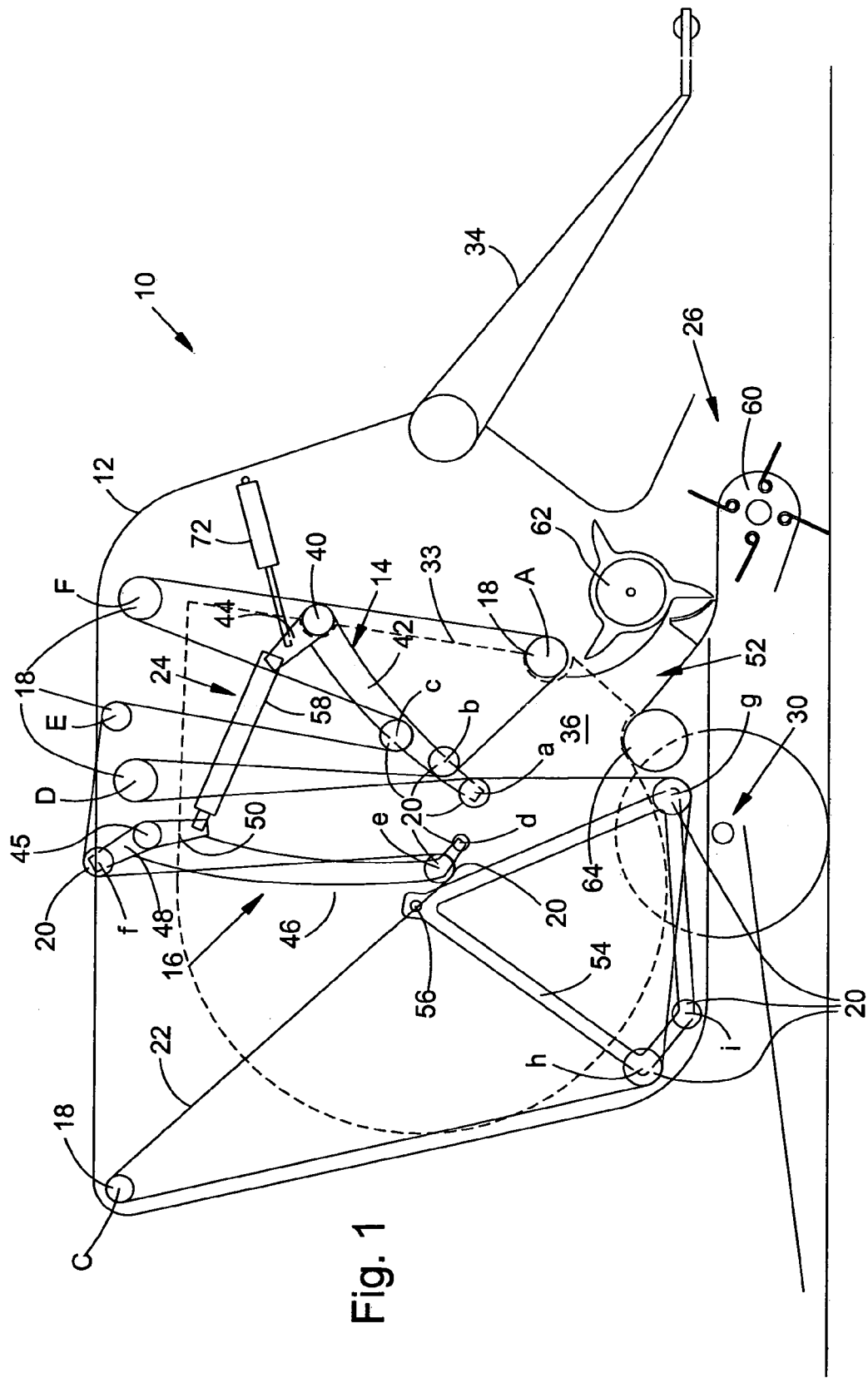
FIG. 1 shows a schematic side view of a round baler according to a first embodiment having two tension arms controlled by a single actuator in an empty stage.

FIG. 1 shows a round baler 10 having a chassis 12, a first pivot arm 14, a second pivot arm 16, fixed rolls 18, mobile rolls 20, baling means 22, a baling means control 24, a feeding mechanism 26 and an unloading mechanism 28.

This round baler 10 is of the variable chamber type and is pulled behind a tractor or the like (not shown) over a field to pick-up crop and to form round cylindrical bales thereof, as this is known in general. Although it is not shown, this round baler 10 may comprise a twine, net or plastic wrapping system, known as well. Furthermore the round baler 10 may be part of a self-propelled vehicle or be of the pull type.

The chassis 12 substantially has a wheeled axle 30, side structures 32 defining an outer side walls, to which an inner pair of side walls 33 are attached, and a tongue 34. The wheeled axle 30 may be of the single rigid axle type as shown, or of the tandem axle type with or without spring suspension. Each side structure 32 is oriented vertically, is carried by the wheeled axle 30 and forms the round baler 10 with walls in the lateral direction. Such side structures 32 and independent inner side walls are disclosed in more detail in EP 1 264 531, to which this refers, but this invention is not limited to a use with such design. In this case the side structures 32 are not split in the area of a bale chamber 36 formed between them.

The side structures 32 stay in place, when a formed bale 38 is ejected, as opposed to side walls in the prior art, of which a rear portion is lifted during unloading the bale 38. While in general the walls 33 could be an integral part of the side structures 32, they are shown in dashed lines in the following embodiments as parts, which are attached to the side structures 32 and assume as the only function to cover the bale chamber 36 laterally. Unlike in the prior art they are not split in halves and do not or hardly extend beyond the silhouette of a completed bale 38. If such separate walls 33 are present, the pivot arms 14 and 16 and the fixed rolls 18 are carried by other parts of the side structures 32. The tongue 34 is fixed to the side structures 32 as this is known, to connect the round baler 10 to the tractor (not shown). The distance between the side walls on the side structure 32 may be adjustable during operation.

The first pivot arm 14 is located between the side structures 32 and assumes substantially the form of an "U". The base of the "U" of the first pivot arm 14 is journalled on an axis 40 oriented horizontally and transverse to the travel direction of the round baler 10 and being fixed with respect to the side structures 32. The axis 40 is located approximately one third of the side structures 32 length from the front and one third of the side wall or side structure 32 height from the top. Legs 42 of the "U" of the first pivot arm 14 are respectively positioned closely adjacent inner surfaces of, and extend parallel to, the pair of inner side walls 33 and are pivotable in a vertical direction between a 7:00 (bale start position) and 11:00 (full bale position) o'clock pointer position, when viewed from the R.H. side, shown in the drawing. The length of the legs 42 reaches almost half of the height of the side structure 32, they terminate substantially close to a line between a fixed roll D and a mobile roll g, when an unloading pivot frame 54 is in its lower position. Rigidly connected to the legs 42 or to the base of the "U" is at least one lever arm 44 located adjacent an outer surface of one of the inner side walls 33.

The second pivot arm 16 is of similar "U" construction as the first pivot arm 14, whereas an axis 45 for the base of the "U" is located close to the upper edge of the side structures 32 at about the half of their length. Legs 46 of the "U" of the second pivot arm 16 extend as well adjacent inner surfaces of, and parallel to, the inner pair of side walls 33 and are pivotable in a vertical direction between a 6:00 (bale start position) and an 8:00 (full bale position) o'clock pointer position, when viewed from the R.H. side. The legs 46 are slightly longer than the legs 42. Finally at one side of the second pivot arm 16 a lever arm 48 is connected to receive a mobile roll 20 as described later, and to the other side at least one lever arm 50, is located adjacent the outer surface of one of the inner side walls 33 and attached, together with the lever arm 44 to the baling control means 24, also described later. Both lever arms 48, 50 and the legs 46 form substantially a "T" form.

Fixed rolls 18 have end portions being rotatably journalled in, on or at the side structures 32, whereas they all run parallel to each other and parallel to the ground on which the round baler 10 stands. Depending on the chosen embodiment more or less fixed rolls 18 may be present, whereas most of them are of the same design, a roll body journalled on a shaft or stub shaft or a roll body with fixed stub shafts rotatably received in bearings (not shown) in side structures 32. However, the diameter of the rolls 18 may be different from roll 18 to roll 18. It is obvious that "fixed" means, that their position is fixed, whereas the rolls 18 as such can rotate. For the sake of the ongoing description the fixed rolls 18 are designated by capital letters "A" and "C" through "F", whereas:

"A" refers to a fixed roll 18 slightly above an inlet 52 to the bale chamber 36 and above and close to the feeding mechanism 26;

"C" refers to a fixed roll 18 in the upper rear corner area of round baler 10;

"D" refers to a fixed roll 18 close to the upper edge of the side structures 32 and at about the half of their length;

"E" refers to a fixed roll 18 also close to the upper edge of the side structure 32, but between the upper front corner area of the round baler 10 and the fixed roll 18 referenced by D, and "F" refers to a fixed roll 18 in the upper front corner area of the round baler 10.

At least one of the rigid rolls 18 is driven and formed such that it may transfer movement energy from the driven roll 18 to the baling means 22. Some of the rolls 18 may have guide means for the baling means 22.

The position of mobile rolls 20, may vary during the baling process, and may run parallel to the fixed rolls 18. The mobile rolls 20 are designated by small letters a through i, whereas:

"a" refers to a mobile roll 20 in the end region (remote from the axis 40) of the legs 42 of the first pivot arm 14;

"b" refers to a mobile roll 20 close to the end region (remote from the axis 40) of the legs 42 of the first pivot arm 14;

"c" refers to a mobile roll 20 at about the half of the length of the legs 42 of the first pivot arm 14;

"d" refers to a mobile roll 20 in the end region (remote from the axis 45) of the legs 46 of the second pivot arm 16;

"e" refers to a mobile roll 20 close to the end region (remote from the axis 45) of the legs 46 of the second pivot arm 16;

"f" refers to a mobile roll 20 between the free end portions of lever arms 48 of the second pivot arm 16;

"g" refers to a mobile roll 20 located in a lower front (as seen in FIG. 1) corner area of unloading pivot frame 54, "h" refers to a mobile roll 20 located in a lower rear (as seen in FIG. 1) corner area of the unloading pivot frame 54 and "i" refers to a mobile roll 20 located between the rolls g and h, but close to h and slightly below a line through rolls g and h of the unloading pivot frame 54.

The unloading pivot frame 54 has substantially the form of a triangle, an upper corner (as shown in FIG. 1) of which is journalled about an axis 56, parallel to the axes 40, 45 and located very close to mobile roll 20, ref. e, when the second pivot arm 16 assumes its position, when bale forming starts. One end of the frame 54 is located in a space defined by the side walls 32 and 33 at one side of the baler while another end of the frame 54 is located in a space defined by the sidewalls 32 and 33 at an opposite side of the baler. The rear lower corner area of the unloading pivot frame 54 carries the mobile rolls i and h and finds itself beyond curved perimeter portions of the inner side walls 33, formed at a radius about the axis 56 in the rear lower corner area of the side structure 32, and the front lower corner area of the unloading pivot frame 54 carries the mobile roll g and is also located beyond the curved perimeter portions of the side walls 33 and immediately behind a lower roll 64 to be discussed below and shown in FIG. 1.

The baling means 22 in this embodiment is formed by a set of belts, running parallel to each other in laterally spaced relationship. Instead of, a single endless belt or a chain and slat conveyor could be used to provide for flexibility, allowing to rotate over the rolls 18 and 20. The routing of the baling means 22 is described in the following with respect to the embodiment and mode of operation shown in FIG. 1. Starting from fixed roll 20 ref. A, the route is to F, then between c and b to c-E-f and between d and e, from e to C and h, then between h and i, to g and then between a and b, to D then back between a and b, to A and back to F. During the mode of operation in FIG. 1, the baling means 22 is not routed over mobile rolls 20 d and i. Another loop may be formed around roll D, whereas its size decreases with the growing bales and is determined by the position of the mobile rolls a and b.

The baling control means 24 is composed of various not shown pump, sump, valves, sensors, lines, a CPU, etc. and for the pivot arms 14, 16 at least one actuator 58 extending between and pivotally fixed to lever arms 44 of the first pivot arm 14 and lever arms 50 of the second pivot arm 16. The control means 24 receives and computes signals coming from the various round baler components as well as from an operator. The output signals of the CPU controlling the actuator 58 are such, that during bale formation a certain resistance acts onto the pivot arms 14, 16 to provide for a wanted density in the bale 38 and that after unloading the bale 38, the pivot arms 14, 16 return to their initial bale starting position. The actuator 58 of this embodiment is in the form of a single or double acting linear hydraulic motor; alternatively it could be an electric motor.

As shown in FIGS. 1–4 and different from the second to the forth embodiment, only this single actuator 58 is used to control the position of the first and of the second pivot arm 14, 16. Nevertheless it is shown an actuator 72, connected at one end to the side structure 32 and at the other end to the lever arm 44, which may be used to control both pivot arms 14, 16 during or after the unloading of the bale 38. Alternatively to the use of actuator 58 in the form of a hydraulic cylinder attached directly to the pivot arms 14, 16 or their lever arms 44, 50 a hydraulic cylinder and a spring can be used. The spring could be a strong spring, like a coil spring, an electric or pneumatic motor could be used or actuator including a hydraulic cylinder, of a spring, or a motor, connected by a cable or linkage to both pivot arms 14, 16 or directly to one of the pivot arms 14, 16 and via a cable or link to the other pivot arm 16, 14. This applies as well to the subsequent embodiments, in which more than one actuator is used. The unloading pivot frame 54 is raised and if need be lowered by an unshown hydraulic actuator, which is controlled as well by these baling control means to achieve a synchronized movement.

The feeding mechanism 26 includes a pick-up 60, downstream thereof a conveyor 62 formed as a cutting unit, a converging auger or other transport mechanism and in the area of the inlet 52 a bottom roll 64, which all together assist in taking crop from the ground and deliver it through the inlet 52 into the bale chamber 36, where it is rolled to a bale 38.

Figure 3:
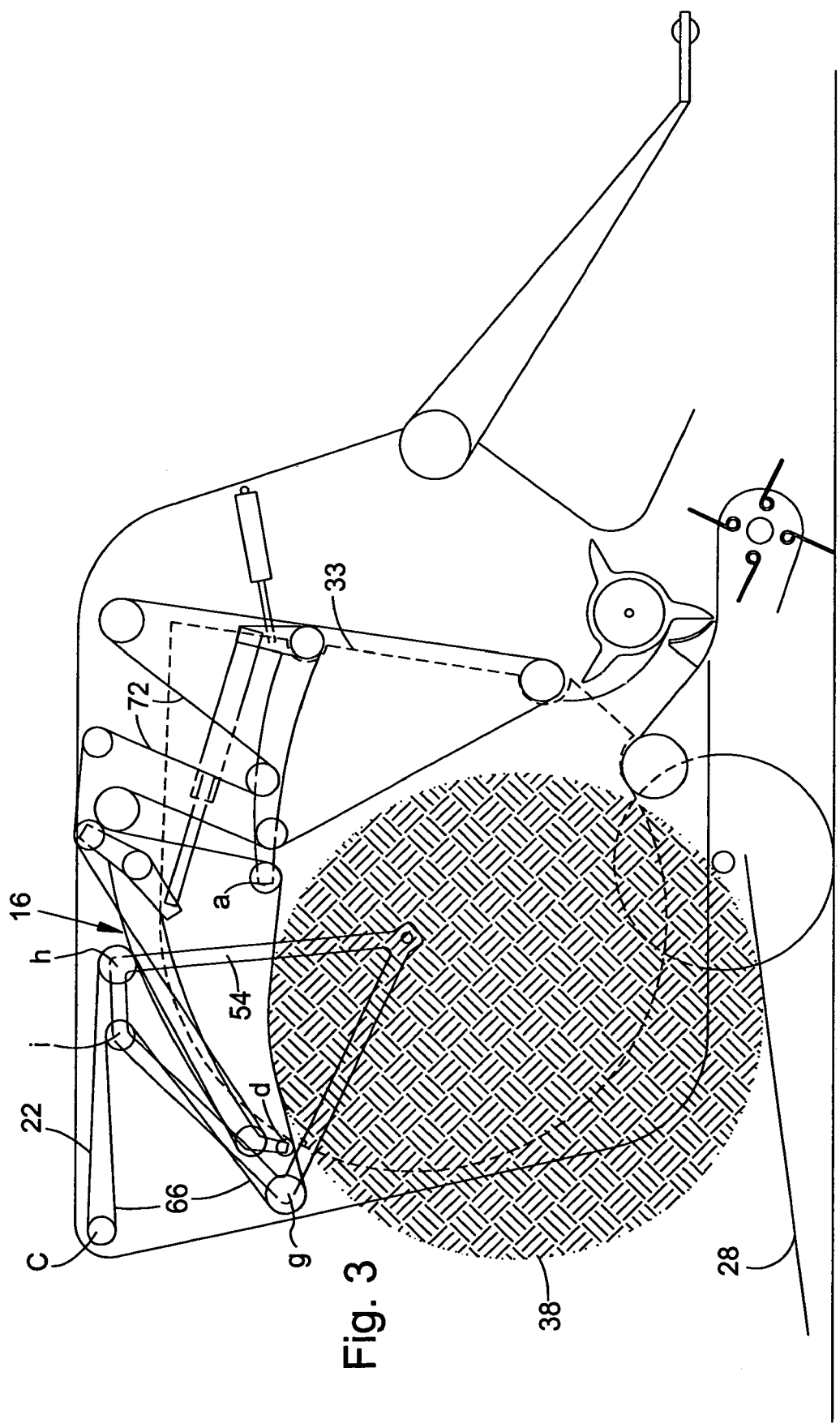
FIG. 3 shows the round baler of FIG. 1 with a completed bale during unloading.
Figure 4:
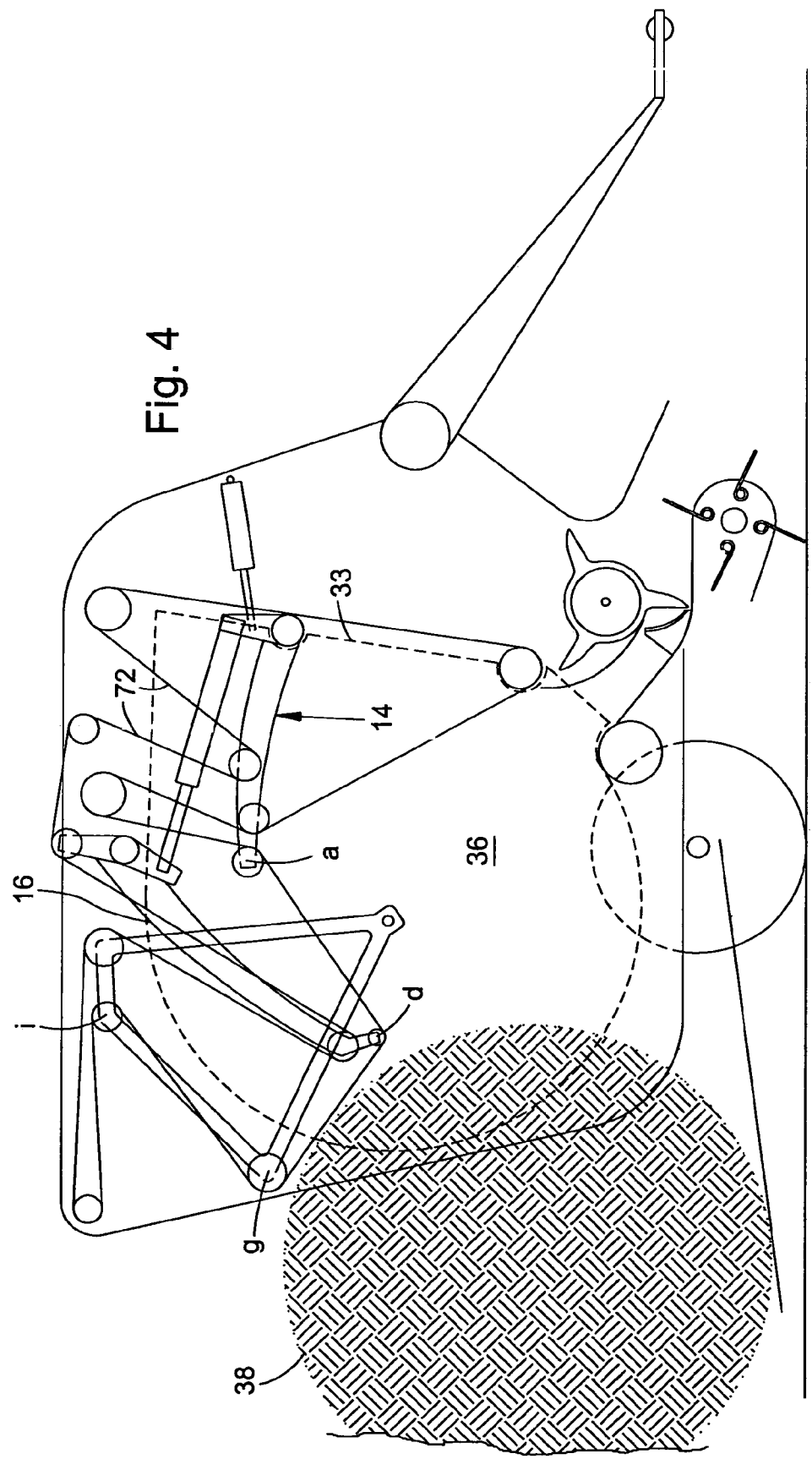
FIG. 4 shows the round baler of FIG. 1 with a completed bale after unloading.

The unloading mechanism 28 (as shown in FIG. 3) is formed as a ramp, either remote controlled or spring loaded, which the unloaded bale 38 rolls down onto the ground, as this is known.

Having described the structure of the round baler 10 so far, its function is as follows, starting from the situation in FIG. 1. As shown in FIG. 1 the baling means 22 is between a and g as well as between b and A form two sides of the bale chamber 36, which is kept minimal, since pivot arm 14 is in its lowest, 7:00 position. Roll g lies adjacent to bottom roll 64, since the unloading pivot frame 54 assumes its lowest position, which brings the span between rolls a and g into a vertical orientation. The actuator 58 assumes its minimal length and both pivot arms 14, 16 assume their lowest location.

Figure 2:
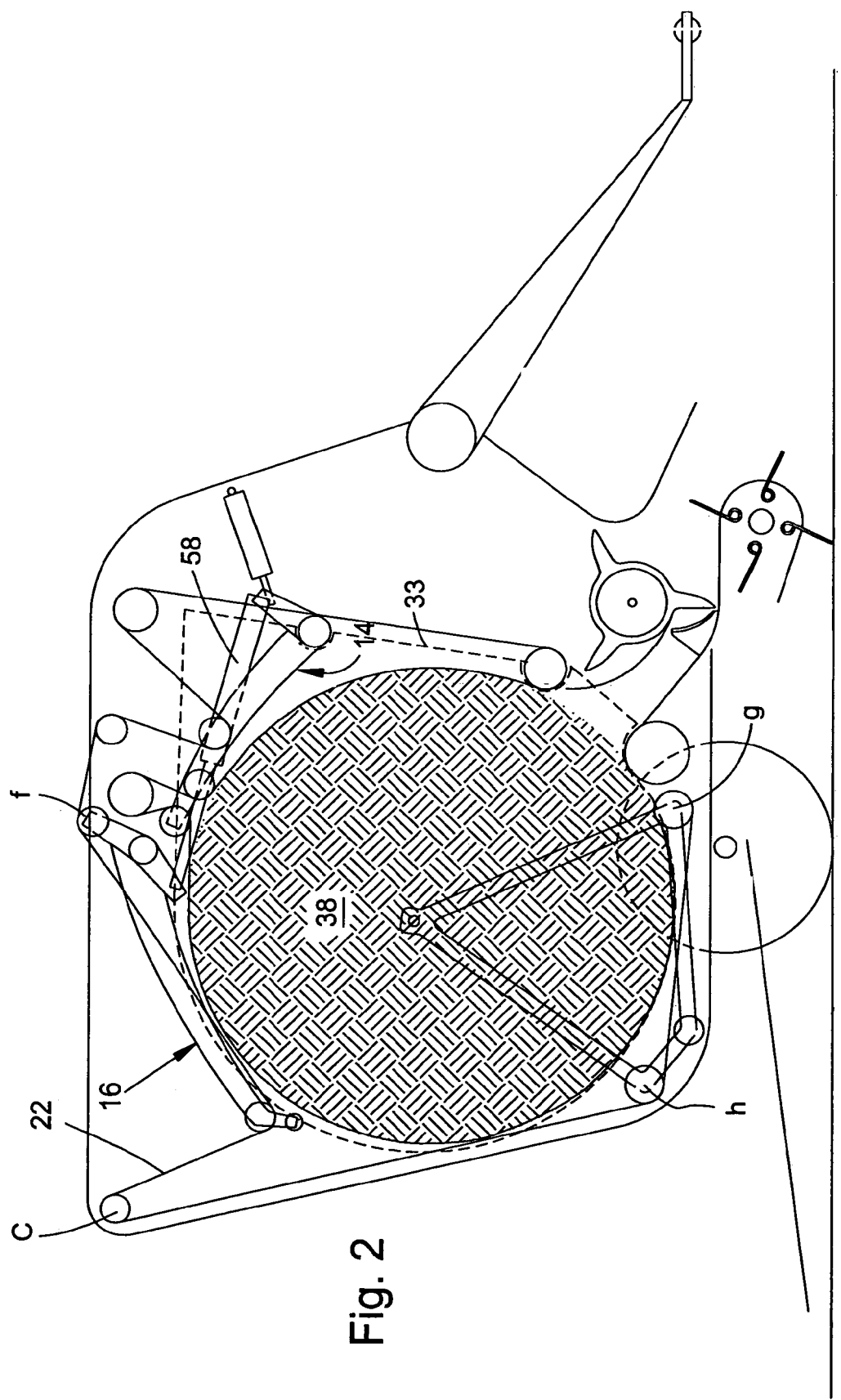
FIG. 2 shows the round baler of FIG. 1 with a completed bale.

When crop is fed continuously through the inlet 52, a bale 38 will start to grow and push first pivot arm 14 upward thereby extracting actuator 58 against a force provided by resistance in the baling control means 24, for example created by a nozzle or a valve. Simultaneously, pivot arm 16 will be pulled upwardly by the baling means 22 shortening the span between rolls C and f in order to adjust to the growing circumference of the bale 38. Both pivot arms 14, 16 rotate clockwise, when looking at the drawing. Movement of the pivot arms 14, 16 and thus also of the mobile rolls a–f continues until the bale 38 has reached its desired or maximum size as shown in FIG. 2. When the bale chamber 36 is full the pivot arms 14, 16 reached their upper position and follow approximately the circumference of the bale 38. The unloading pivot frame 54 and the rolls g to i are still in their lower position and together with the baling means 22 support the bale 38.

In order to unload the bale 38 the unloading pivot frame 54 is pivoted clockwise about axis 56 into the position shown in FIG. 3, in which a line through the center of rolls g and h shows an inclination to the ground of about 30 degrees and finds itself above the second pivot arm 16. Due to the upward movement also roll i moved upwardly and hit the span between rolls g and C. Roll i creates a loop 66 (as shown in FIG. 3) to take out slack in the baling means 22, which appears, as soon as the bale 38 rolls down the unloading mechanism 28. As soon as the bale 38 has left the bale chamber 36, the pivot arms 14 and 16 move downward in a counter clockwise direction, whereas the mobile roll d hits the span between rolls g and a. Once the second pivot arm 16 has lowered about halfway, the bale 38 can no longer roll back into the bale chamber 36. Finally the situation shown in FIG. 1 is reached again.

Figure 5:
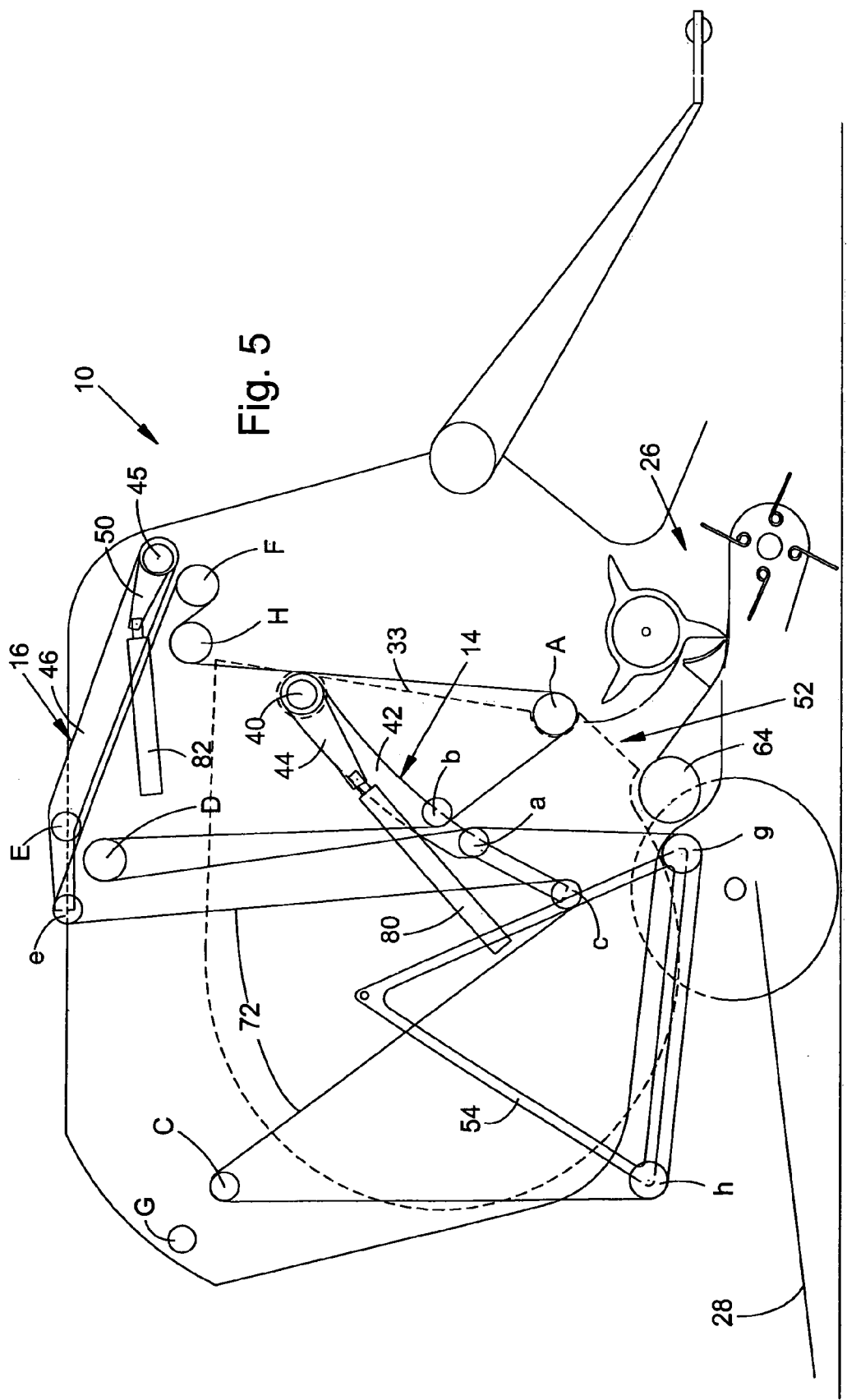
FIG. 5 is a schematic side view of a round baler according to a second embodiment having two tension arms controlled by a two actuators in an empty stage.
Figure 6:
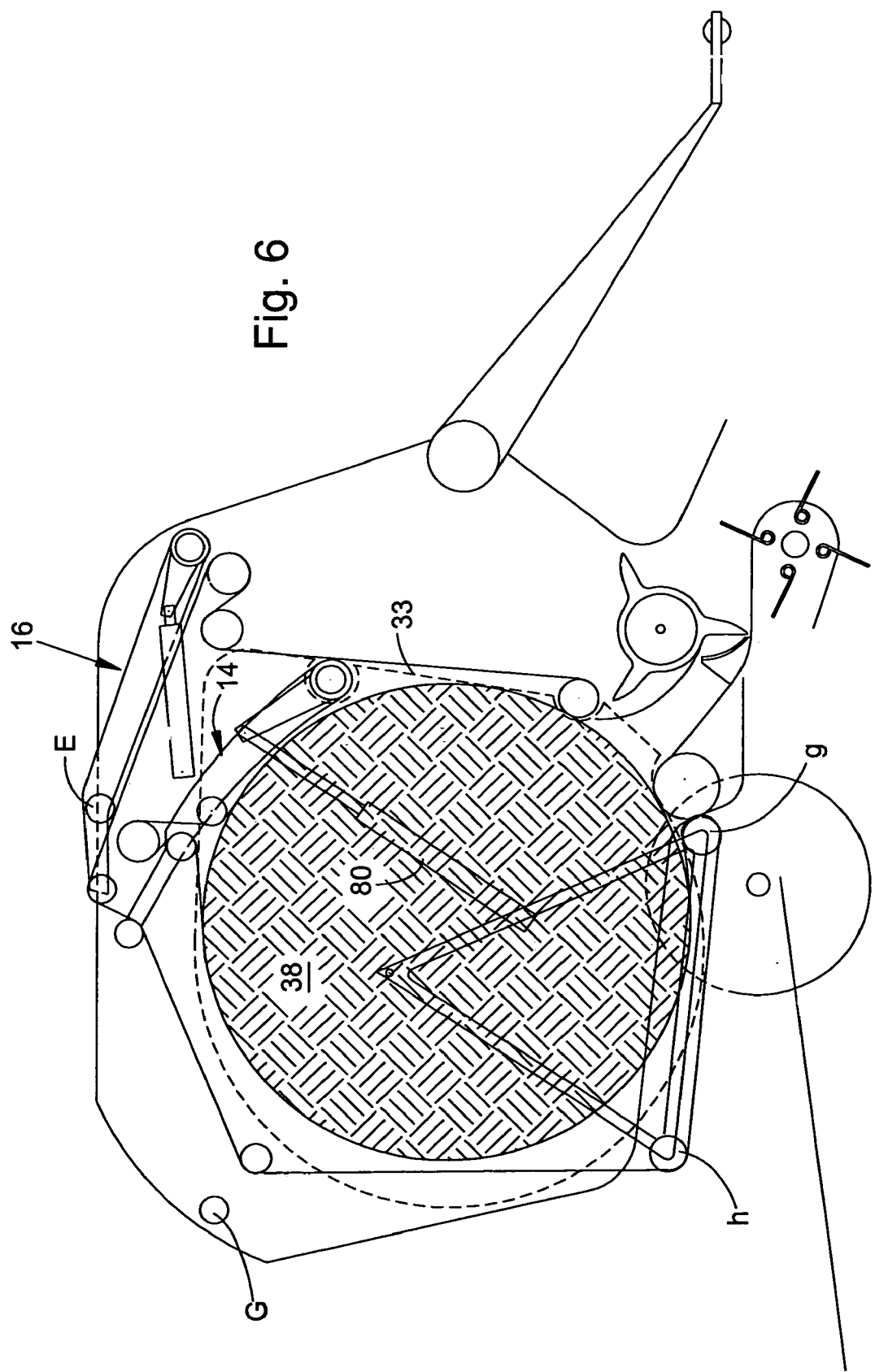
FIG. 6 shows the round baler of FIG. 5 with a completed bale.
Figure 7:
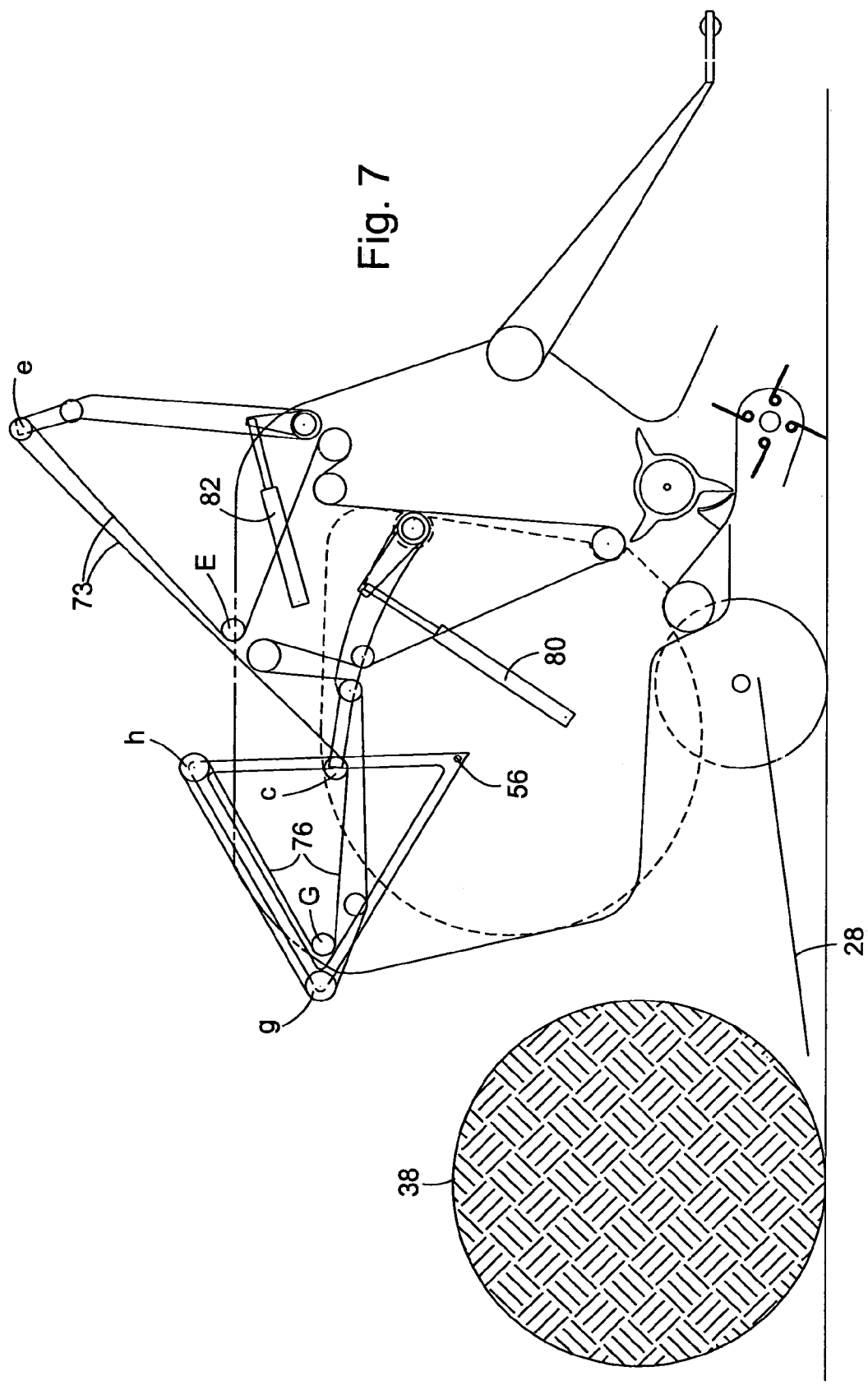
FIG. 7 shows the round baler of FIG. 5 with a completed bale during unloading.

FIGS. 5 to 7 show a second embodiment having many components in common with the first embodiment, especially three mobile rolls 20 a, b and c on the first pivot arm 14.

The purpose of the round baler 10 and the design of its chassis 12 are the same or equivalent to that of the first embodiment.

The first pivot arm 14 has a similar design and is located and journalled in a similar or identical way. In particular it has lever arms 44, to which an actuator 80 may be connected; but in this embodiment these lever arms 44 are almost inline with and on the same side as the legs 42, just slightly inclined in the rear direction. However, this first pivot arm 14 is longer than the one of the first embodiment, and extends about half of its length beyond the point, where it crosses the strand between fixed roll D and mobile roll g.

The second pivot arm 16 is different from the one of the first embodiment in many respects. The second pivot arm 16 of the second embodiment is journalled on axis 45, which is located in the area of the front upper corner of the side structures 32, close to roll F. The legs 46 extend outside and above the bale chamber 36 and terminate slightly rearward of fixed roll D. At the end region close to the axis 45 lever arms 50 are fixed to the legs 46 and extend inline and with them. At their ends on axis 45 the legs 46 are connected by the base of the "U". The legs 46 may pivot in a range between a 10:00 and a 12:00 o'clock pointer position.

During operation first pivot arm 14 rotates clockwise viewing the drawing when the bale 38 is growing, while the second pivot arm 16 rotates in the same direction only when the bale 38 is unloaded.

Fixed rolls 18 A, C, D, E and F are in the same or similar position as those of the first embodiment. However fixed rolls G and H are provided in addition, which are located at different places. Roll G is located close to role C, but slightly above and rearward of it. Roll H is located very close to roll F, but at same height and rearward of it in order to increase the length about which the baling means 22 wraps roll F. Roll E is present but slightly above roll D and closer to it.

Mobile rolls 20 are different in so far, as roll c is located on the other side of rolls a and b, towards the freely moving end of the first pivot arm 14 remote from axis 40. Second pivot arm 16 bears only one mobile roll e at the end of it remote from axis 45, whereas in the empty stage of the round baler 10 roll e is located very close to and rearward and above of fixed roll D. Rolls g and h are present on the unloading pivot frame 54, while roll i is missing.

The baling means 22 is equivalent to the one described in the first embodiment. Baling control means 24 uses similar components, but instead of a single actuator 58 for both pivot arms 14, 16 two separate actuators 80 and 82 are used, which may be of the single or double acting type. Each actuator 80, 82 is attached with one end to the side structure 32 and with the other end to either the first or the second pivot arm 14, 16 or their lever arms 44 and 50 respectively. Although these actuators 80, 82 could be controlled to move independent of each other, the baling control means 24 will generate signals, which assure, that their movement is synchronized. In an alternative design both actuators 80, 82 could be replaced by a single actuator 58 like in the first embodiment.

The orientation of the actuators 80, 82 is chosen such that they run under an angle of about 30 degrees, when they are in the empty bale chamber mode as shown in FIG. 5. The actuator 80 for the first pivot arm 14 extends under an angle of about 25 degrees upwardly from the rear to the front, whereas the cylinder end is connected to the side structure 32 and the piston end to a lever arm 44. The actuator 82 for the second pivot arm 16 shows a little inclination to the ground of about 5 degrees upwardly from the rear to the front, which similar attachment as the actuator 80.

The feeding mechanism 26, the unloading mechanism 28, the unloading pivot frame 54 and the bottom roll 64 are similar or identical to those of the first embodiment.

From fixed roll A the routing of the baling means 22 is to H, then between H and F, from F then between E and e and over e to c to C to h to g, then between a and b, then to D and back between a and b, and back to A. In this routing loop 72 is formed by means of the strand between rolls C and e during bale formation. During unloading a loop 76 is created by fixed roll G, when it is hit by the strand between mobile rolls h and C. This will take out slack from the baling means 22, when the bale 38 has left. Finally, a loop 73 is generated by roll e pulling a strand between mobile roll e and fixed roll E. Said loop 73 extends under an angle of about 45 degrees.

Bale formation starts when the round baler 10 assumes the position as shown in FIG. 5. In this position the first and second pivot arm 14, 16 and the unloading pivot frame 54 are in their lowest positions. Both actuators 80, 82 are shortened to their minimum. The bale chamber 36 has the smallest dimension and is substantially of triangular shape.

When crop is fed continuously through the inlet 52 a bale 38 will start to grow and push pivot arm 14 upward in clockwise direction thereby extracting actuator 80 against a force provided by resistance in the baling control means 24, for example created by a nozzle, a valve or the like. Second pivot arm 16 will stay in place. Movement of the first pivot arms 14 and thus also of the mobile rolls a, b and c continuous until the bale 38 has reached its desired or maximum size, as shown in FIG. 6. When the bale chamber 36 is full the first pivot arm 14 reached its highest position, in which it follows approximately the circumference of the bale 38, while the second pivot arm 16 is still in its lowest. Accordingly, the actuator 80 has been extracted to its maximum length. The unloading pivot frame 54 and the rolls g and h are still in their lower position and together with the baling means 22 support the bale 38. Since the first pivot arm 14 moves towards mobile roll e, the loop 72 shortens close to non-existence.

In order to unload the bale 38 the unloading pivot frame 54 is pivoted clockwise about axis 56 into the position shown in FIG. 7, in which a line through the center of rolls g and h shows an inclination to the ground of about 30 degrees. Due to the upward movement, the span between rolls h and c hits fixed roll G and forms a loop 76, which takes out slack from the baling means 22. Roll e creates another loop 73 (as shown in FIG. 7) from the strand between the rolls E and c to take out more slack from the baling means 22, which appears, as soon as the bale 38 rolls down the unloading mechanism 28. As soon as the bale 38 has left the bale chamber 36, the first and second pivot arm 14 and 16 move downward in a counter clockwise direction and finally the situation shown in FIG. 5 is reached again.

FIGS. 8 to 11 show a third embodiment having many components in common with the second embodiment, especially the three mobile rolls a–c on the first pivot arm 14, whereas one of them is located in its end region and having two actuators 80 and 82 for the two pivot arms 14, 16.

The purpose of the round baler 10 and the design of its chassis 12 are the same or equivalent to that of the first and second embodiment. The first pivot arm 14 has substantially the same design and is located and journalled in a similar or identical way as the one of the second embodiment. In particular it has substantially inline lever arms 44, to which actuator 80 may be connected, and legs 42, which extend beyond the strand of the baling means 22 between the rolls g and D.

Figure 8:
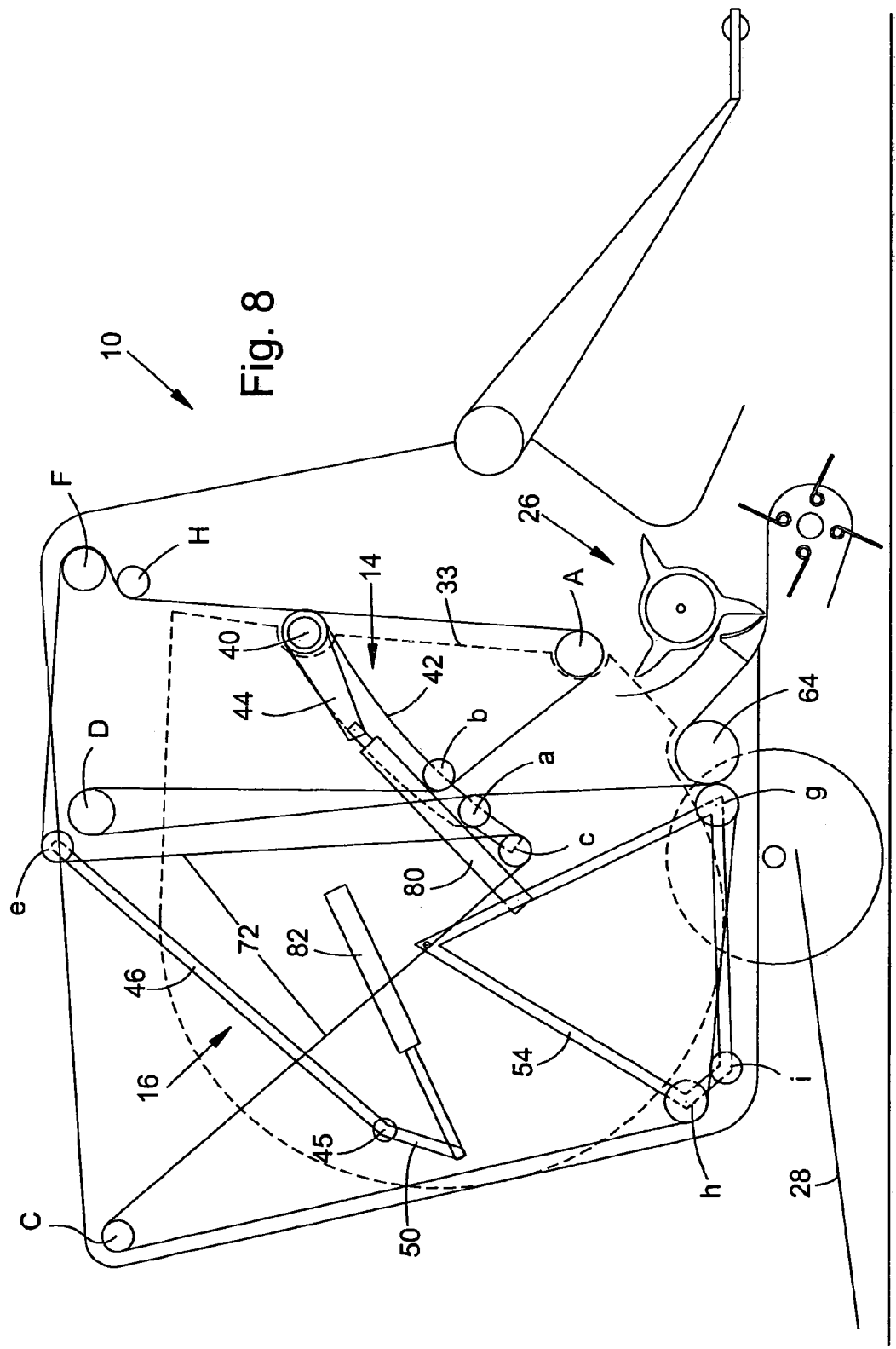
FIG. 8 is a schematic side view of a round baler according to a third embodiment having two pivot arms, one having three mobile rolls and being controlled by two actuators in total, in an empty stage.
Figure 9:
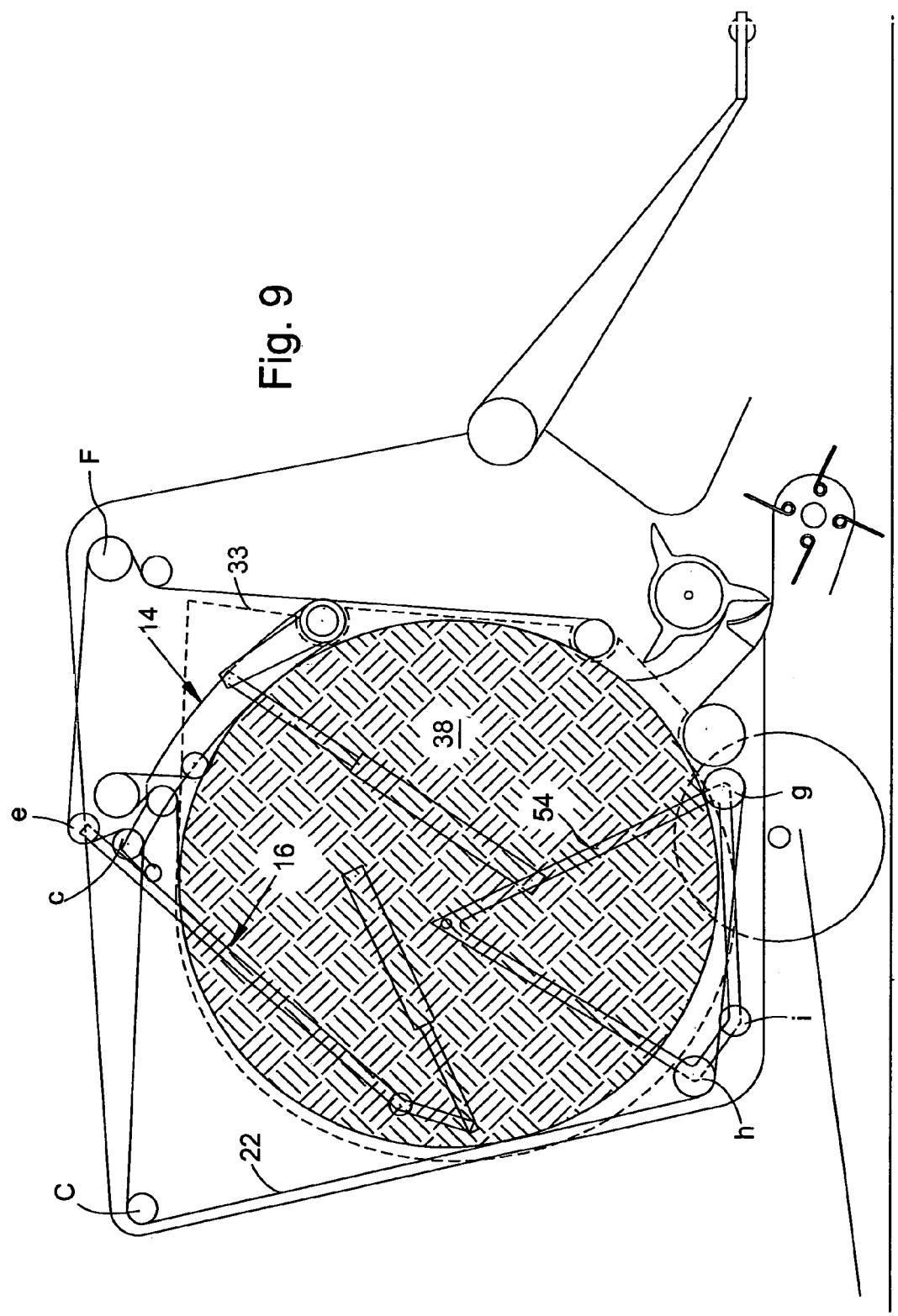
FIG. 9 shows the round baler of FIG. 8 with a completed bale.

The second pivot arm 16 is different from the one of the first and second embodiments in several respects. The second pivot arm 16 of the third embodiment is journalled on axis 45, which is located substantially halfway of the height of the side structure 32 and close to its rear edge. The legs 46 extend outside the bale chamber 36 and terminate slightly above fixed roll D, when the round baler 10 is in its empty stage. When the bale chamber 36 is empty, as this is shown in FIG. 8 the legs 46 run substantially under an angle of 45 degrees to the horizontal. At the end region close to the axis 45 lever arms 50 are fixed to the legs 46 and extend with a little inclination to them on the other side of axis 45. The legs 46 are connected by the base of the "U" at the end remote from axis 45. The legs 46 may pivot in a range between an 11:00 and a 1:30 o'clock pointer position.

During bale forming operation only pivot arm 14 moves upwardly in a clockwise direction, while second pivot arm 16 pivots only during and after unloading the bale 38. Fixed rolls 18 A, C, D and F are in the same or substantially the same position as those of the first embodiment and roll H shown in the second embodiment is used in a comparable way and location.

Mobile rolls 20 a, b, and c on the first pivot arm 14 are arranged in the same way as in the second embodiment, roll c finds itself in the end region of the first pivot arm 14, while rolls a and b are located between roll c and the pivot axis 40, but all of them are in the half remote from the axis 40. Roll e is again located at the end region of second pivot arm 16 remote from the axis 45. Rolls g, h, and i are present on the unloading pivot frame 54 like in the first embodiment.

The baling means 22 is equivalent to the one in the first embodiment. Baling control means 24 is designed comparable to the second embodiment, two separate actuators 80 and 82 are used, which may be of the single or double acting type. Each actuator 80, 82 is attached with one end to the side structure 32 and with the other end to either the first or the second pivot arm 14, 16 or their lever arms 44 and 50 respectively. Although these actuators 80, 82 could be controlled to move independent of each other, the baling control means 24 will generate signals, which assure, that their movement is synchronized.

In an alternative design both actuators 80, 82 could be replaced by a single actuator 58 as in the first embodiment. The orientation of the actuators 80, 82 is chosen such that they run under an angle of about 30 degrees, when they are in the empty bale chamber mode as shown in FIG. 8. The actuator 80 for the first pivot arm 14 extends under an angle of about 45 degrees upwardly from the rear to the front, whereas the cylinder end is connected to the side structure 32 and the piston end to a lever arm 44. The actuator 82 for the second pivot arm 16 shows a lesser inclination to the ground upwardly from the rear to the front, with similar attachment as the actuator 80, whereas the cylinder end is located above the piston end and close to the center of the bale chamber 36 when it is filled.

Figure 10:
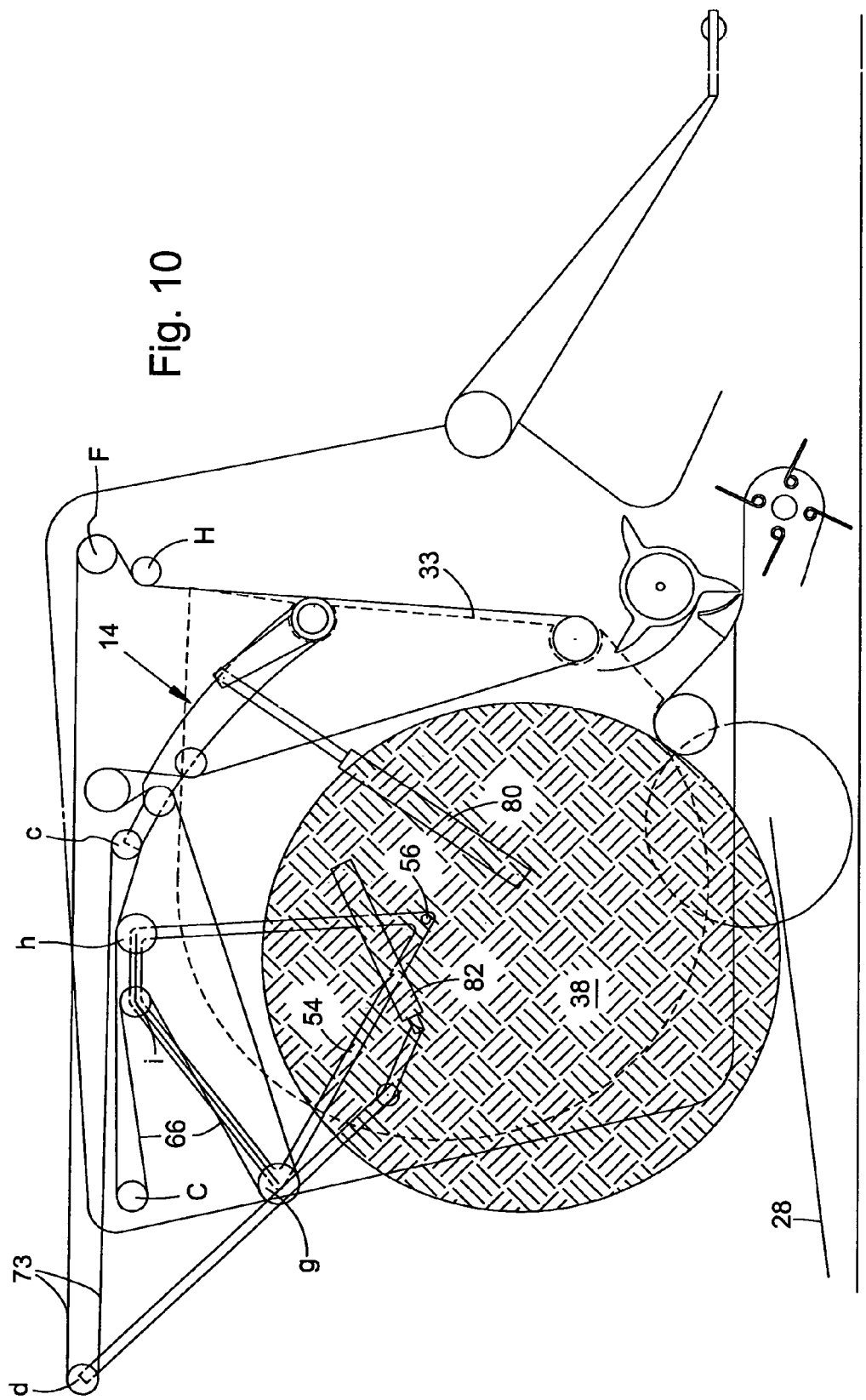
FIG. 10 shows the round baler of FIG. 8 with a completed bale during unloading.
Figure 11:
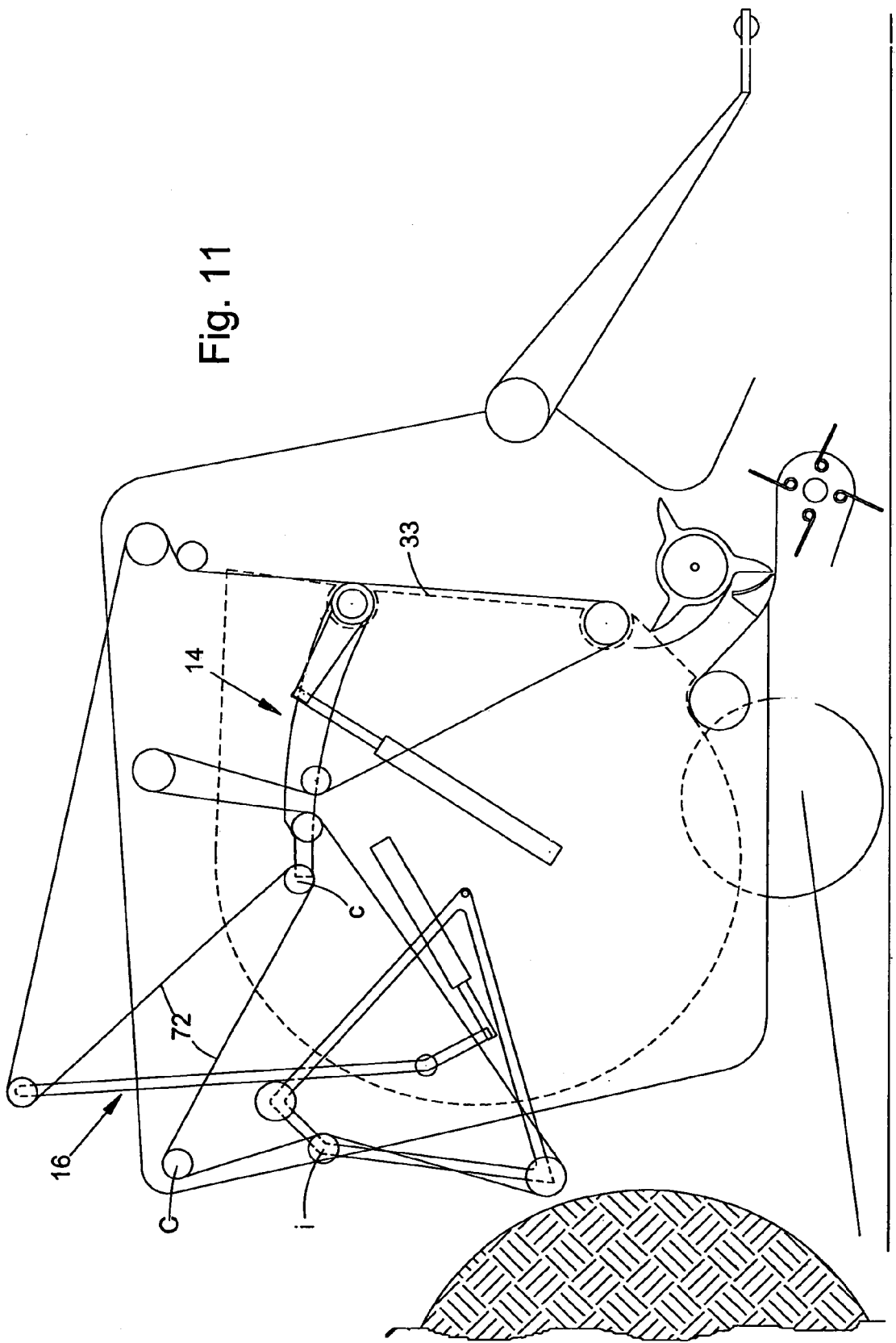
FIG. 11 shows the round baler of FIG. 8 when a completed bale is unloaded and the pivot arms return to a bale starting position.

The feeding mechanism 26, the unloading mechanism 28, the unloading pivot frame 54 and the bottom roll 64 are similar or identical to those of the first and the second embodiment. From Fixed Roll A, the routing of the baling means 22 is as follows to H then between H and F, from F to e and between c and a, thereafter around c, C, h, going between h and i, to g then between a and b, to D and back between a and b, and finally back to A. In this routing loop 72 is formed by means of the strand between rolls C and e during bale formation. A loop 73 is generated by roll e pulling a strand between mobile roll c and fixed roll F, when the first pivot arm 14 is in its upper position, as shown in FIG. 10. Said loop 73 runs almost parallel to the ground, when the bale 38 is about to leave the bale chamber 36. A loop 66 will be formed, when the unloading pivot frame 54 is pivoted upwardly and roll i hits the span between rolls C and g as this is known from the first embodiment.

Bale formation starts when the round baler 10 assumes the position as shown in FIG. 8. In this position the first and second pivot arm 14, 16 and the unloading pivot frame 54 are in their lowest positions. Actuator 80 is shortened to its minimum, while actuator 82 is fully extended. The bale chamber 36 has the smallest dimension and is substantially of triangular shape.

When the crop is fed continuously through the inlet 52, a bale 38 will start to grow and push pivot arm 14 clockwise upwardly as viewed thereby extracting actuator 80 against a force provided by resistance in the baling control means 24, for example created by a nozzle or a valve. Second pivot arm 16 will remain in its 1:30 position. Movement of the pivot arm 14 and thus also of the mobile rolls a, b and c continues until the bale 38 has reached its desired or maximum size as shown in FIG. 6. When the bale chamber 36 is full the first pivot arm 14 reached its highest position, in which it follows approximately the circumference of the bale 38, while the second pivot arm 16 is still in its lowest position. Accordingly the actuator 80 has been extracted to its maximum length. The unloading pivot frame 54 and the rolls g to i are still in their lower position and together with the baling means 22 support the bale 38.

In order to unload the bale 38, the unloading pivot frame 54 is pivoted clockwise about axis 56 into the position shown in FIG. 7, in which a line through the center of rolls g and h shows an inclination to the ground of about 30 degrees. Due to the upward movement also roll i moves upwardly and hits the span between rolls g and C. Roll i creates a loop 66 (as shown in FIG. 7) to take out slack in the baling means 22, which appears, as soon as the bale 38 rolls down the unloading mechanism 28. As soon as the bale 38 has left the bale chamber 36, the unloading pivot frame 54 has to move down first, because the first pivot 14 is kept by the baling means 22 around roll c in its upper position and can not move downwardly since the various runs of the baling means 22 above roll h would stick on each other the baling means 22 would not grant length to the first pivot arm 14 moving downwardly. Then the first pivot arm 14 moves downwardly in a counterclockwise rotation, while the second pivot arm 16 moves from the 11:00 position via the 12:00 position to the 1:30 position, thereby enlarging the loop 72 to the biggest possible extent. Finally the situation shown in FIG. 8 is reached again.

Figure 12:
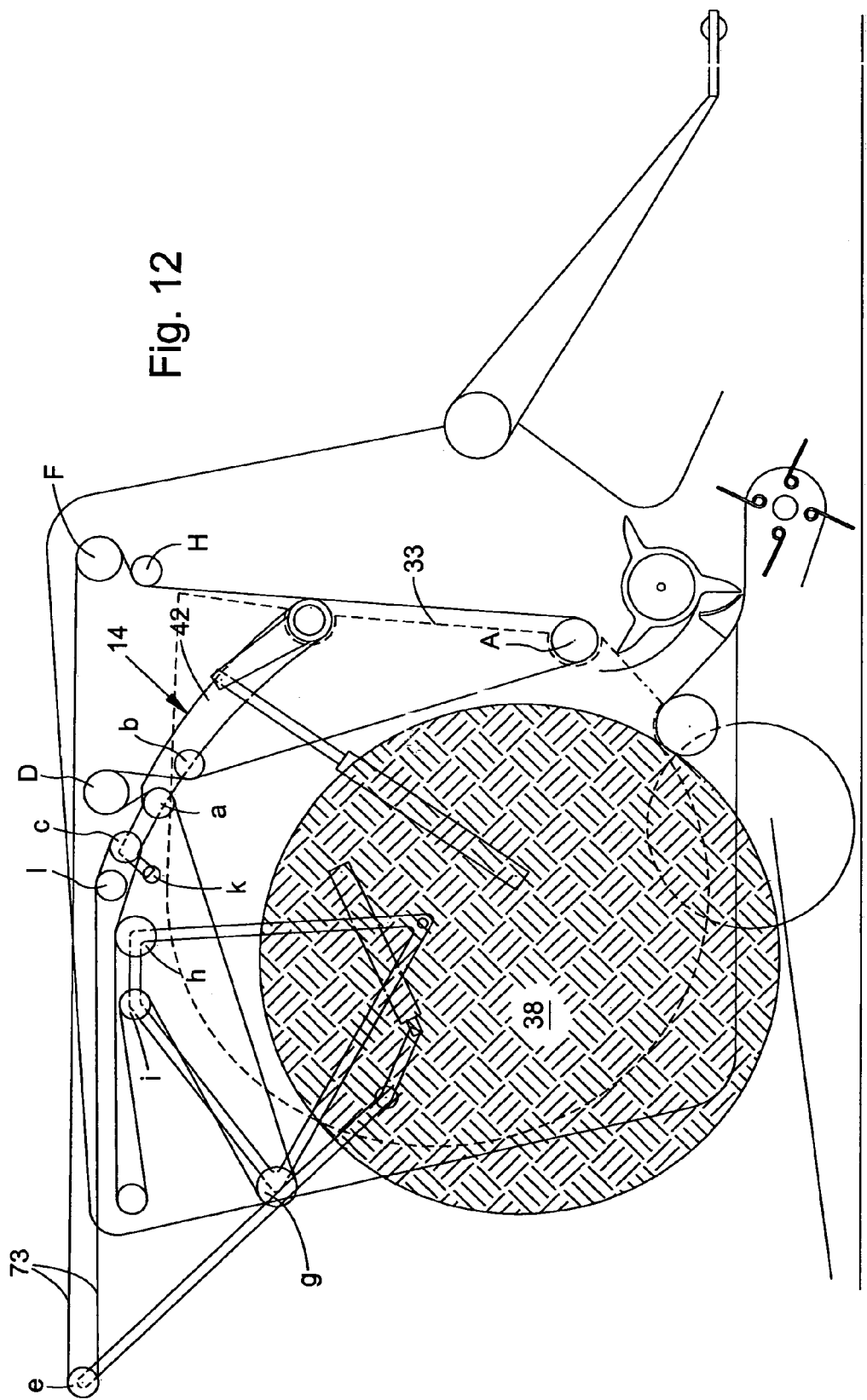
FIG. 12 is a schematic side view of a round baler according to a fourth embodiment having two tension arms controlled by two actuators and three mobile rolls on one of them, when the bale gets unloaded.
Figure 13:
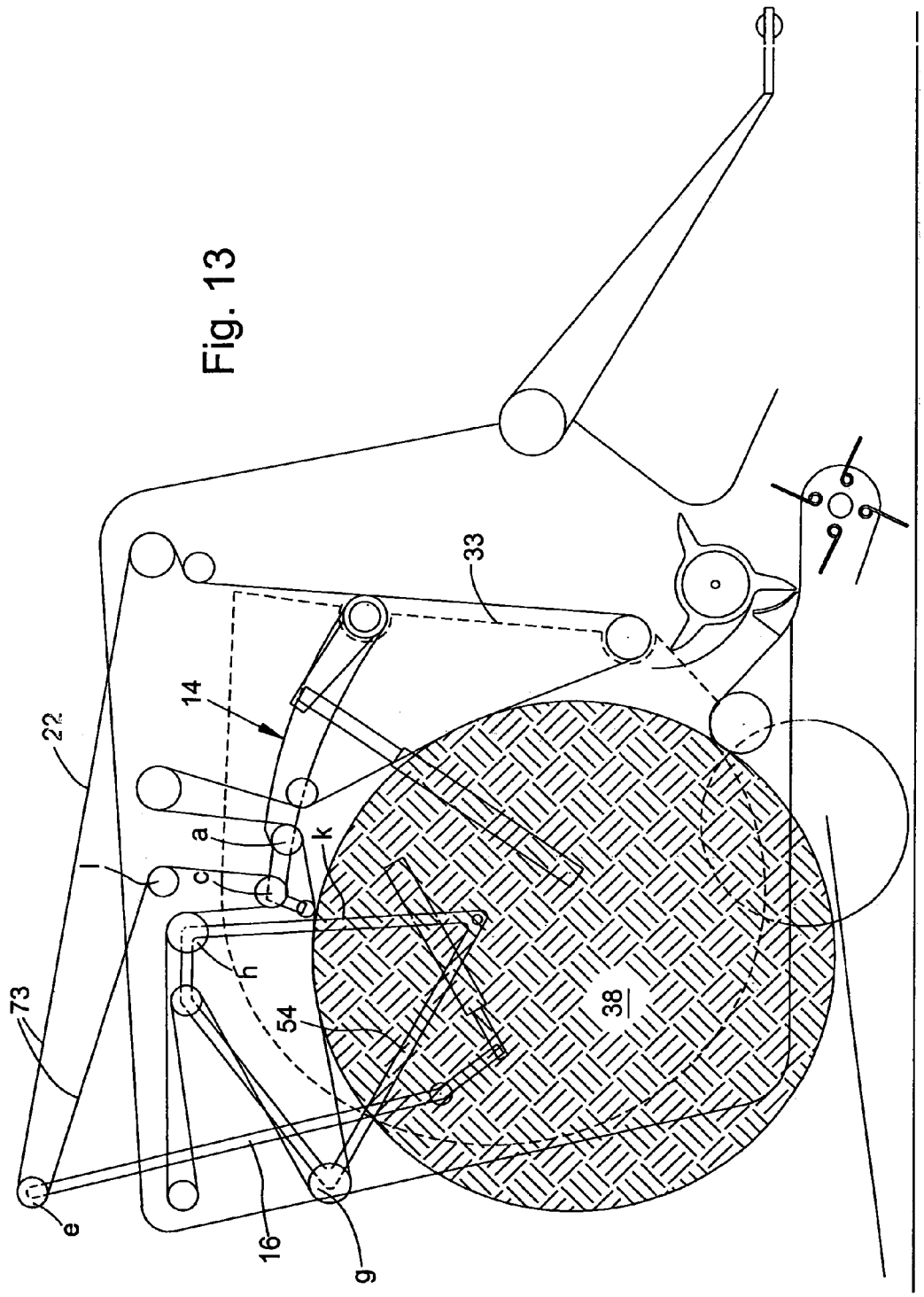
FIG. 13 shows the round baler of FIG. 12 after the bale is unloaded.

FIGS. 12 and 13 show a fourth embodiment being only slightly different from the third embodiment insofar, as a fixed roll l is provided between the side structures 32 at about the same height as fixed roll D but rearward of it such, that in the stage of a completed bale 38 roll c on the first pivot arm 14 may be moved into the space between D and 1. Furthermore a mobile roll k is provided at the end region of the first pivot arm 14, where roll c is provided and this roll k is carried on short arms extending downwardly and approximately perpendicular from the legs 42, when being in the full bale situation. The baling means 22 is routed through the gap between the rolls c and k.

In this fourth embodiment starting from fixed roll A the routing of the baling means 22 is to H then between H and F, from F to e then between c and a thereafter between c and k, to C, to h and between h and l, then to g and between a and b, to D and back between a and b, and back to A. The function of rolls l and k becomes apparent only after the bale 38 is unloaded and attention is drawn to FIG. 13 for better understanding.

As to be seen in FIG. 13, roll l keeps the lower strand of the loop 73 apart from roll h of the unloading pivot frame 54, when this is in an upper position to unload the bale 38. Thus this strand cannot rib on the surface of the strand of the baling means 22 running over roll h. In a similar way roll k keeps the strand of the baling means 22 extending between rolls a and g apart from the strand running over roll c and avoids friction there. Since the friction problem is avoided between these strands the first pivot arm 14 may pivot down while the unloading pivot frame 54 stays in the upper position. This will reduce the time needed before the next bale formation may start.

Figure 14:
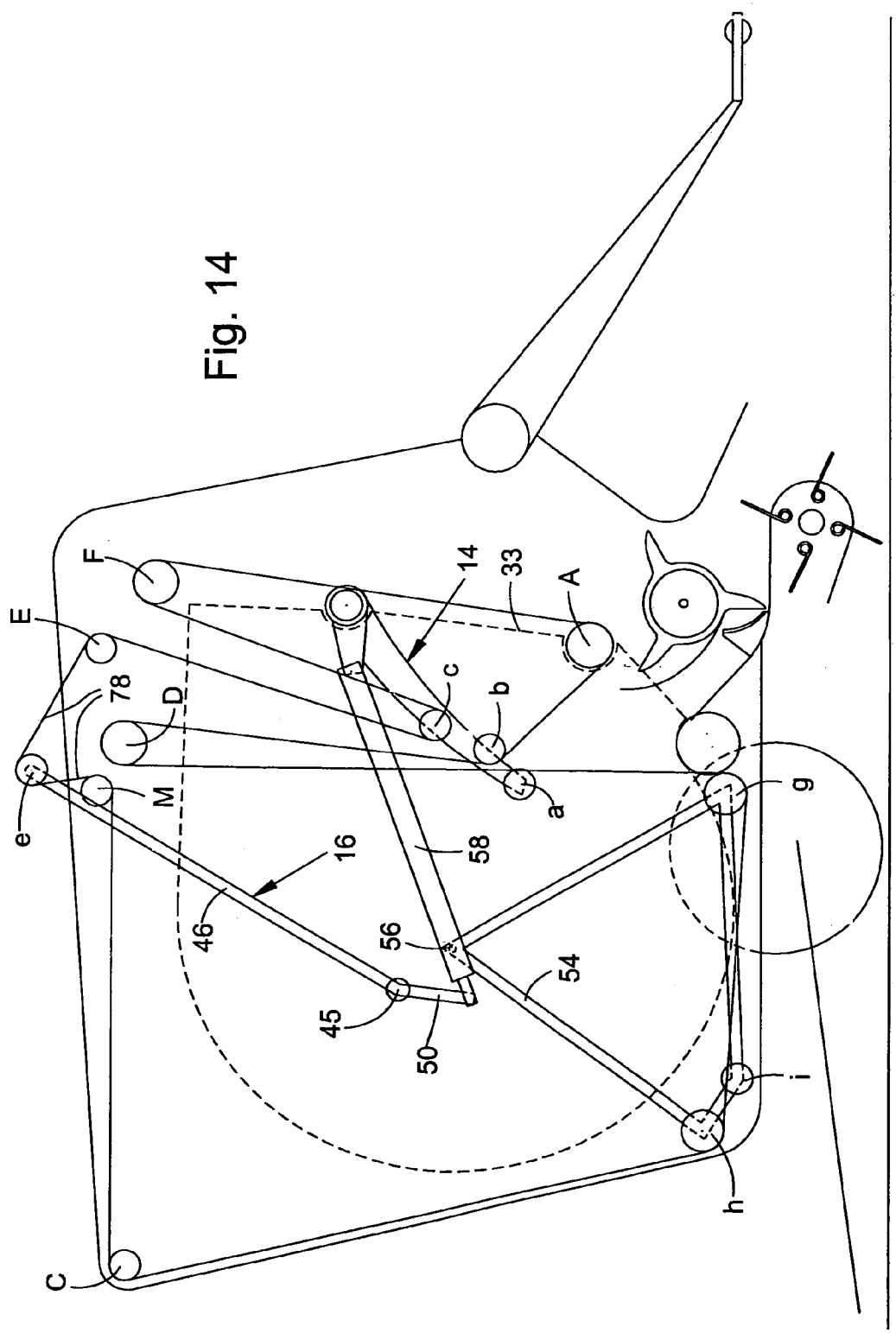
FIG. 14 is a schematic side view of a round baler according to a fifth embodiment having two tension arms controlled by a single actuator in an empty stage.

FIGS. 14 to 16 show a fifth embodiment, which is between the first and the third embodiment. In this fifth embodiment the first pivot arm 14 is the same as the one in the first embodiment, it has three mobile rolls a, b, and c, of which the pair of rolls a and b limiting the bale chamber 36 at its upper end is provided in the end region of the first pivot arm 14 and the roll c is located at about the center of it.

The second pivot arm 16 is journalled on axis 45, which is located slightly above and rearward of the center of the bale chamber 36, when it is filled completely, and thus also of pivot axis 56 of the unloading pivot frame 54. The legs 46 of the second pivot arm 16 are located outside the bale chamber 36. The lever arm 50 connecting the pivot arm 16 to the actuator 58 is formed as an almost straight extension of the pivot arm 16 and finds itself below the axis 45, when the bale chamber 36 is empty. At the end of the legs 46 remote from axis 45 only mobile roll e is present as well as a connection making the base of the "U". The form of the second pivot arm 16 and the location of the mobile roll e is chosen such, that roll e is always located above fixed roll C and may—during the movement of the second pivot arm 16—follow a path above the upper edge of the side structures 32.

A new fixed roll M is journalled in the side structures 32 or its walls and located very close, but slightly rearward and upward of roll D. The mobile roll e on the second pivot arm 16 always applies the strand of the baling means 22 between fixed rolls M and E to create a loop 78 of a little or huge extent. This loop 78 is used to take up slack in the baling means 22, when the bale 38 is unloaded.

Starting from mobile roll 20 ref. A the route of the baling means is to F, to c to E then between e and M, from M to C and then between h and i, to g then between a and b, to D and back between a and b, and back to A. The function of the round baler 10 in the fifth embodiment is described as follows. As long as bale chamber 36 is empty, the first pivot arm 14 assumes its lowest position, the second pivot arm 16 assumes an almost 1:00 position, with the roll e being almost immediately above fixed roll M and the unloading pivot frame 54 is in the lowermost position. During bale formation the first pivot arm 14 moves upwardly from an about 7:00 position in clockwise direction into a substantially 11:00 position, while the second pivot arm 16 moves from a 1:00 position to a 1:30 position in order to give some length to the baling means during bale formation; accordingly the length of the loop 78 decreases, while the length of the actuator 58 increases.

When the bale 38 gets unloaded the actuator 58 is retracted and extends the loop 78 until it reaches roll C. This will take out the slack in the baling means 22, as shown in FIG. 16.

It is therefore intended that the foregoing detailed description be regarded as illustrative rather than limiting, and that it be understood that it is the following claims, including all equivalents, that are intended to define the spirit and scope of this invention.

The invention claimed is:

1. A round baler having side structures disposed outwardly of a pair of inner side walls, a plurality of fixed and mobile rolls, the baler comprising:

flexible baling means creating one endless loop and being routed over said plurality of rolls to define a bale chamber together with said inner side walls;

a first moveable pivot arm carrying first, second and third rolls of said plurality of mobile rolls of which at least said third roll is an idler roll;

a second moveable pivot arm carrying fourth, fifth and sixth rolls of said plurality of mobile rolls of which at least said fourth roll is an idler roll acting on a span of said baling means extending between two rolls of said plurality of rolls; and an unloading pivot frame provided with a seventh roll of said plurality of mobile rolls and being moveable independent of the inner side walls and side the structures.

2. The round baler according to claim 1, wherein the idler roll on the first pivot arm is located between a pivot axis of the first pivot arm and the other mobile rolls thereon.

3. The round baler according the claim 1 wherein said first and second rolls carried by the first pivot arm close the baling chamber in an upper region.

4. The round baler according the claim 1 wherein the second pivot arm is moveable through the bate chamber while a bale is being unloaded and after the bale is unloaded.

5. The round baler according to claim 1 wherein said fifth and sixth rolls on the second pivot arm are at its end and spaced apart from a pivot axis of the second pivot arm.

6. The round baler according to claim 1 wherein the first pivot arm is provided with said first, second and third rolls being located at its end.

7. The round baler according to claim 1 wherein one actuator acts on both the first and second pivot arms.

8. The round baler according to claim 7 wherein a second actuator is provided, acting on the first actuator.

9. The round baler according to claim 7 wherein a second actuator is provided, acting directly on the first actuator.

10. The round baler according to claim 7 wherein the actuator is a linear actuator.

11. The round baler according to claim 7 wherein the actuator moves against resistance while the bale chamber is being filled.

12. The round baler according to claim 7 wherein the actuator joins the first and second pivot arms at lever arms arranged such that both the first and second pivot arms rotate in the same or opposite directions.

13. The round baler according to claim 1 further comprising an actuator of the first pivot arm and an actuator for the second pivot arm, which both of the actuators are controlled by a common baling control means.

14. The round baler according to claim 13 wherein one or more of the actuators are not fully retracted when the bale formation process starts.

15. The round baler according to claim 1 wherein the second arm is pivotable about an axis located above the bale chamber.

\* \* \* \* \*